United States Patent
Moeller et al.

(10) Patent No.: US 11,731,334 B2
(45) Date of Patent: Aug. 22, 2023

(54) CONTROL SYSTEM FOR MACRO ADJUSTMENT OF A POLYMERIC MELT FORMING SLOT TYPE DIE

(71) Applicant: Davis-Standard, LLC, Pawcatuck, CT (US)

(72) Inventors: Robert F. Moeller, Baldwinsville, NY (US); Richard Kanarski, Mystic, CT (US); Michael Augustine, Fulton, NY (US)

(73) Assignee: Davis-Standard, LLC, Pawcatuck, CT (US)

( * ) Notice: Subject to any disclaimer, the term of this patent is extended or adjusted under 35 U.S.C. 154(b) by 217 days.

(21) Appl. No.: 17/242,921

(22) Filed: Apr. 28, 2021

(65) Prior Publication Data
US 2021/0339451 A1   Nov. 4, 2021

Related U.S. Application Data

(60) Provisional application No. 63/018,082, filed on Apr. 30, 2020.

(51) Int. Cl.
*B29C 48/31* (2019.01)
*B29C 48/92* (2019.01)
(Continued)

(52) U.S. Cl.
CPC ............ *B29C 48/313* (2019.02); *B29C 48/08* (2019.02); *B29C 48/92* (2019.02);
(Continued)

(58) Field of Classification Search
CPC ..... B29C 48/07; B29C 48/08; B29C 48/2552; B29C 48/269; B29C 48/285;
(Continued)

(56) References Cited

U.S. PATENT DOCUMENTS

| | | | |
|---|---|---|---|
| 4,594,063 A * | 6/1986 | Reifenhauser | B29C 48/313 425/141 |
| 5,770,129 A | 6/1998 | Monti | |
| 2008/0018026 A1* | 1/2008 | Gregg | B29C 48/872 264/519 |

FOREIGN PATENT DOCUMENTS

| | | |
|---|---|---|
| EP | 0273985 A1 | 7/1988 |
| WO | 2012170713 A1 | 12/2012 |

OTHER PUBLICATIONS

Extended European Search Report issued in corresponding EP Application No. 21171228.6, dated Sep. 24, 2021, pp. 1-9.

* cited by examiner

*Primary Examiner* — Xiao S Zhao
*Assistant Examiner* — Joseph S Leyson
(74) *Attorney, Agent, or Firm* — Robinson & Cole LLP

(57) ABSTRACT

A system for adjusting a gap in a slot die for producing a polymeric web. The system includes a slot die that has a polymer reservoir that extends between a polymer inlet and a melt outlet. The melt outlet has a first edge and a second edge that each extend longitudinally along the melt outlet. The second edge is opposite the first edge. A plurality of actuators move the second edge along a plurality of positions along a length of the second edge. The first edge is spaced apart from the second edge by a gap that has an adjustable profile. A pressure sensor communicates with the reservoir and measures the pressure of the polymer in the reservoir. A control unit with an algorithm correlates the profile of the gap to the pressure in the reservoir. The algorithm is configured to generate control signals to cause the profile of the gap to be uniform.

10 Claims, 7 Drawing Sheets

(51) Int. Cl.
*B29C 48/08* (2019.01)
*B29L 7/00* (2006.01)

(52) U.S. Cl.
CPC .............. *B29C 2948/92019* (2019.02); *B29C 2948/9239* (2019.02); *B29C 2948/92095* (2019.02); *B29C 2948/92152* (2019.02); *B29C 2948/92485* (2019.02); *B29C 2948/92628* (2019.02); *B29C 2948/92828* (2019.02); *B29C 2948/92904* (2019.02); *B29L 2007/008* (2013.01)

(58) Field of Classification Search
CPC ... B29C 48/302; B29C 48/313; B29C 48/365; B29C 48/37; B29C 48/395; B29C 48/92; B29C 2948/92019; B29C 2948/92085; B29C 2948/92095; B29C 2948/92152; B29C 2948/9218; B29C 2948/92333; B29C 2948/92361; B29C 2948/9239; B29C 2948/92409; B29C 2948/92457; B29C 2948/92485; B29C 2948/9259; B29C 2948/926; B29C 2948/92628; B29C 2948/92647; B29C 2948/92828; B29C 2948/92904; B29C 2948/92942
See application file for complete search history.

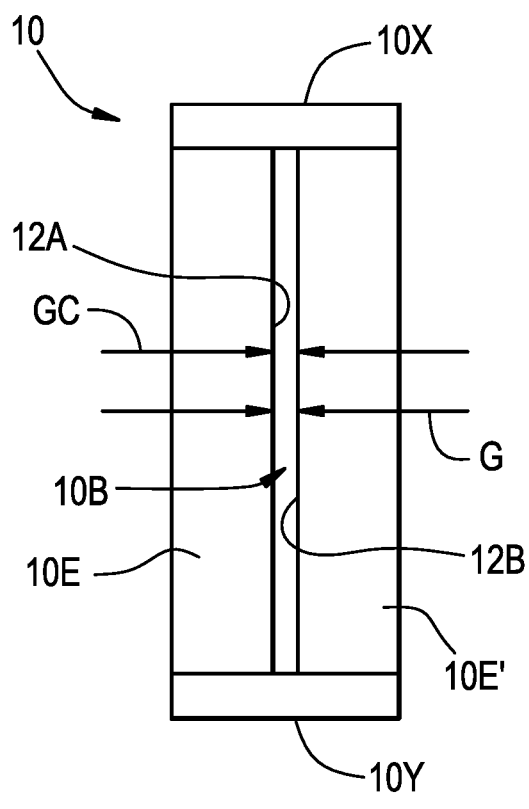 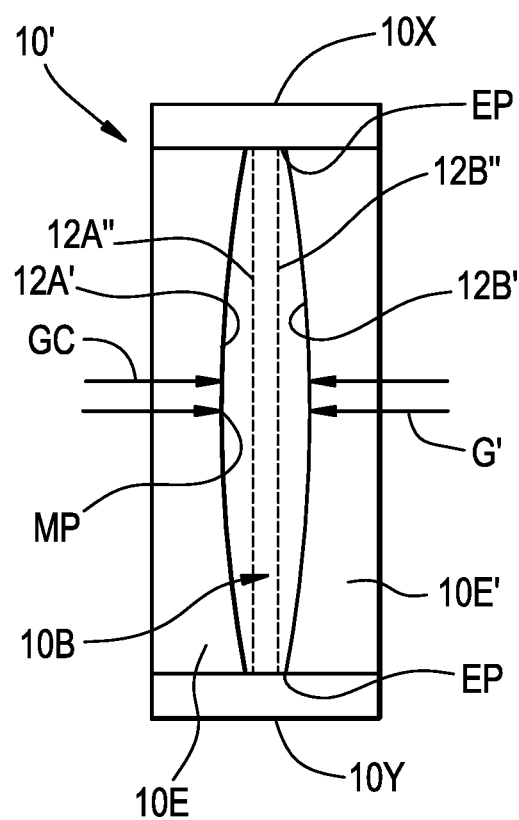

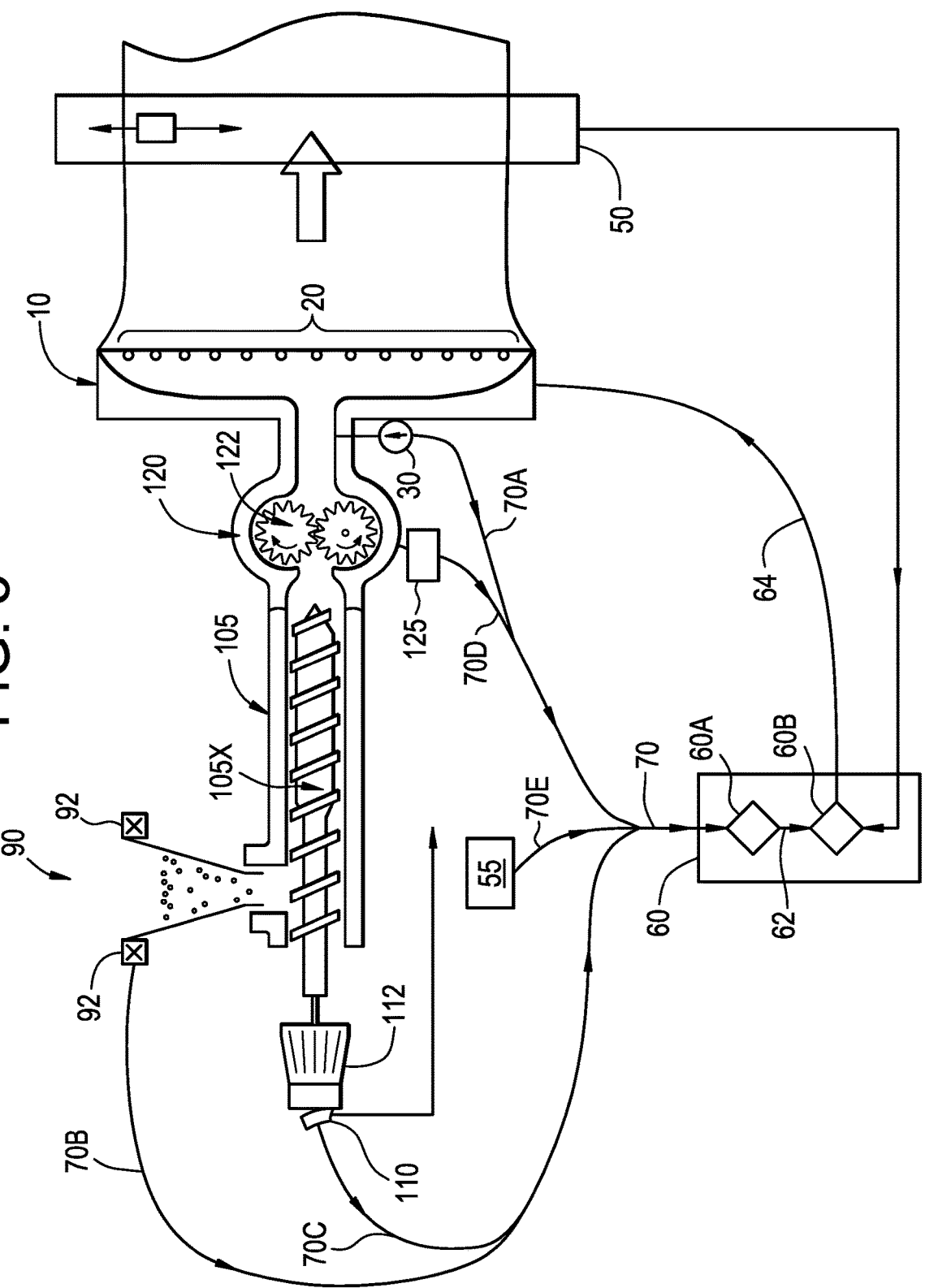

CONTROL SYSTEM FOR MACRO ADJUSTMENT OF A POLYMERIC MELT FORMING SLOT TYPE DIE

CROSS-REFERENCE TO RELATED APPLICATIONS

The present application is a non-provisional application of, and claims priority benefit to, commonly owned and U.S. Provisional Patent Application No. 63/018,082 filed on Apr. 30, 2020, the contents of which are incorporated herein by reference in its entirety.

TECHNICAL FIELD

The present invention is directed to a system for adjusting a gap in a slot die for producing a polymeric web. Specifically, the system includes an algorithm that correlates the profile of the slot die to the pressure in the reservoir upstream of a melt outlet to adjust the profile of the slot die.

BACKGROUND

In the field of polymeric film or sheet forming, extrusion coating, or lamination applications it is necessary for the polymeric melt exiting the melt profile forming lips of a slot type die to be even or flat in a direction transverse to the direction of material flow. As the flow rate of the polymeric melt increases through the melt profile forming lips of the slot type die the resulting pressure internal to the die increases, causing the melt profile forming lips of the die to swell or "clam shell" (changing from the cross-section depicted in FIG. 2A to that depicted in FIG. 2B). The swelling is typically parabolic in shape and more swelling occurs at the center than at the ends. The thickness of the polymeric melt is in direct correlation to the swelling affect, which is caused by an increasing flow rate of polymeric material and a resultant increased pressure created within and across the melt profile forming lips of the slot type die. The swelling or clam shelling of the melt profile forming lips causes the melt to be heavier or thicker in the center than at its ends as the increase in pressure inside the die deforms the die body and melt profile forming lips.

Typical adjustments of the profile forming lips of slot type dies require repeated, iterative measurements (e.g., thickness measurements) of the formed polymeric web, adjustment of the die, and re-measurement of the formed polymeric web. Cross web scanning devices take time to traverse across the formed polymeric web requiring more time to determine a true web profile measurement. Prior art melt forming processes are unable to accurately adjust the melt outlet of the slot die during startup. As a result, existing scanning devices can only determine a cross web profile suitable for automatic control after the film forming line or system reaches steady state operation. Thus, prior art polymeric web forming processes create significant waste of the polymeric web during startup operations to steady state operations.

As a result, there is a need in the art to achieve a flatter polymeric web profile automatically that functions before the system reaches steady state operation.

SUMMARY

There is disclosed herein a system for adjusting a gap in a slot die for producing a polymeric web. The system includes a slot die with a polymer inlet (i.e., an inlet for receiving polymer) and a melt outlet (i.e., an outlet for discharge melted polymer). A polymer reservoir (i.e., a reservoir in the slot die that contains polymer flowing therethrough) extends between the polymer inlet and the melt outlet. The melt outlet has a first edge extending longitudinally along the melt outlet and a second edge extending longitudinally along the melt outlet. The second edge is opposite the first edge. The polymer melt within the polymer reservoir begins to solidify into a partially formed polymeric melt as it exits the melt outlet. The second edge is selectively moveable along a plurality of positions along a length of the second edge. The first edge is spaced apart from the second edge by a gap that has an adjustable profile which extends between a first end and a second end of the slot die. A plurality of actuators are secured to the slot die at an anchor frame. Each of the actuators has an extendable member and a drive unit that is in communication with the extendable member. The extendable member moves a portion of the second edge relative to the first edge in response to forces generated by the drive unit to adjust the profile of the gap. A pressure sensor is in communication with the reservoir. The pressure sensor measures the pressure of the polymer melt in or just prior to the reservoir. A control unit receives the pressure value that is measured by the pressure sensor. The control unit has a first algorithm and an automatic profile control algorithm. The first algorithm includes software with a set of polymer pressure flow rate empirical data (i.e., information acquired by observation or experimentation related to how pressure affects the flow rate of the polymeric material and presented in the form of recorded data) that correlates the profile of the gap to the pressure in the reservoir. The first algorithm generates a control signal which is sent to the automatic profile control algorithm. The automatic profile control algorithm generates actuator control signals and transmits the signals to each of the actuators to cause the drive unit to move the extendable member and to cause the profile of the gap to be uniform between the first end and the second end of the slot die.

In one embodiment, prior to pressurization of the reservoir, the profile of the gap is of a uniform magnitude between the first end and the second end of the slot die. When the reservoir is initially pressurized, the profile of the gap has a parabolic profile with a maximum value at a point midway between the first end and the second end of the slot die and with minimum values adjacent to the first end and the second end of the slot die.

In one embodiment, the system also includes a hopper that has one or more load sensors, each of which measures a loss in weight, over time, of a polymeric material contained in the hopper. The control unit is in communication with each of the load sensors. The load sensors generate a hopper weight based flow rate signal based on the loss in weight, over time, of the polymeric material contained in the hopper. The first algorithm has software with a set of polymer weight flow rate empirical data (i.e., information acquired by observation or experimentation related to how weight of the polymeric material affects the flow rate of the polymeric material and presented in the form of recorded data) that correlates the pressure signal and the hopper weight based flow rate signal to the profile of the gap. The first algorithm generates a control signal which is sent to the automatic profile control algorithm. The automatic profile control algorithm generates actuator control signals and transmits the signals to each of the actuators to cause the drive unit to move the extendable member and to cause the profile of the gap to be uniform between the first end and the second end of the slot die.

In one embodiment, the system also includes a tachometer system that includes a tachometer that measures the rotational speed (e.g., rotations per minute) of a motor that rotates an extruder screw and/or that measures rotational speed of the extruder screw. The tachometer system generates an extruder screw rotational speed based flow rate signal based on the correlation between the rotations of the extruder screw and the amount of polymeric material exiting the extruder. The first algorithm has software with a set of polymer extrusion flow rate empirical data (i.e., information acquired by observation or experimentation related to how rotational speed of an extruder screw affects the flow rate of the polymeric material and presented in the form of recorded data) that correlates the pressure signal and the extruder screw rotational speed based flow rate signal to the profile of the gap. The first algorithm generates a control signal which is sent to the automatic profile control algorithm. The automatic profile control algorithm generates actuator control signals and transmits the signals to each of the actuators to cause the drive unit to move the extendable member and to cause the profile of the gap to be uniform between the first end and the second end of the slot die.

In one embodiment, the system also includes a tachometer system that measures the rotational speed (e.g., rotations per minute) of one or more gears in a gear set of a gear type melt pump. The tachometer system generates a gear set rotational speed based flow rate signal based on the correlation between the rotational speed of one or more of the gears in the gear set of the melt pump and the amount of polymeric material exiting the melt pump. The first algorithm has software with a set of polymer pump flow rate empirical data (i.e., information acquired by observation or experimentation related to how rotational speed of one or more gears in a gear set of a gear type melt pump affects the flow rate of the polymeric material and presented in the form of recorded data) that correlates the pressure signal and the gear set rotational speed based flow rate signal to the profile of the gap. The first algorithm generates a control signal which is sent to the automatic profile control algorithm. The automatic profile control algorithm generates actuator control signals and transmits the signals to each of the actuators to cause the drive unit to move the extendable member and to cause the profile of the gap to be uniform between the first end and the second end of the slot die.

In one embodiment, the system also includes a set point rate that determines a necessary change in control of the control unit based on historical data to reach a desired profile of the gap. The set point rate generates a desired profile flow rate signal based on the desired profile of the gap. The first algorithm has software with a set of polymer historical flow rate empirical data (i.e., information acquired by observation or experimentation related to historical flow rates that resulted in polymeric materials having a desired profile and presented in the form of recorded data) that correlates the pressure signal and the desired profile flow rate signal to the profile of the gap. The first algorithm generates a control signal which is sent to the automatic profile control algorithm. The automatic profile control algorithm generates actuator control signals and transmits the signals to each of the actuators to cause the drive unit to move the extendable member and to cause the profile of the gap to be uniform between the first end and the second end of the slot die.

In one embodiment, the system also includes a measuring device that measures the thickness and/or the mass of the partially formed polymeric melt exiting the slot die proximate to the melt outlet. The automatic profile control algorithm adjusts the profile of the gap in response to the thickness and/or mass of the formed polymeric melt measured by the measuring device.

In one embodiment, the control unit utilizes the first algorithm prior to and during a startup period of the system. However, in some embodiments, the control unit utilizes the first algorithm and/or the automatic profile control algorithm during a steady state operation period.

There is also disclosed herein a system for adjusting a gap in a slot die for producing a polymeric web. The system includes a slot die having a polymer inlet (i.e., an inlet for receiving polymer), a melt outlet (i.e., an outlet for discharge melted polymer), and a polymer reservoir (i.e., a reservoir in the slot die that contains polymer flowing therethrough) extending between the polymer inlet and the melt outlet. A polymer melt within the polymer reservoir begins to solidify into a partially formed polymeric melt as it exits the melt outlet. The melt outlet has a first edge that extends longitudinally along the melt outlet and a second edge that extends longitudinally along the melt outlet and opposite the first edge. The second edge is selectively moveable along a plurality of positions along a length of the second edge. The first edge is spaced apart from the second edge by a gap that has an adjustable profile that extends between a first end and a second end of the slot die. A plurality of actuators are secured to the slot die at an anchor frame. The actuators move a portion of the second edge relative to the first edge to adjust the profile of the gap. A pressure sensor measures the pressure of the polymer melt in or just prior to the reservoir. A measuring device measures a thickness and/or a mass of the partially formed polymeric melt exiting the slot die proximate to the melt outlet. A control unit communicates with the pressure sensor and the measuring device. The control unit has a first algorithm and an automatic profile control algorithm. The first algorithm has software configured with a set of polymer pressure flow rate empirical data (i.e., information acquired by observation or experimentation related to how pressure affects the flow rate of the polymeric material and presented in the form of recorded data) that correlates the profile of the gap to the pressure in the reservoir. The first algorithm generates a control signal which is sent to the automatic profile control algorithm in response to the pressure measured by the pressure sensor. The automatic profile control algorithm has software that generates actuator control signals and transmits the signals to each of the actuators to adjust the profile of the gap in response to the thickness and/or mass per unit area of the formed polymeric melt measured by the measuring device. The control unit utilizes the first algorithm prior to operation of the system and during a startup period of the system. The control unit utilizes the first algorithm and/or the automatic profile control algorithm during a steady state operation period of the system.

In one embodiment, during the steady state operation period of the system the control unit utilizes the automatic profile control algorithm to generate broad adjustment actuator control signals that provide broad adjustments to the profile of the gap and the control unit utilizes the first algorithm to generate fine tuning adjustment actuator control signals that provide fine tuning adjustments to the profile of the gap.

BRIEF DESCRIPTION OF THE DRAWINGS

FIG. 2A is a bottom view of the slot die of FIG. 1A shown in a static state and taken across section 2-2;

FIG. 2B is a bottom view of the slot die of FIG. 1A shown in a pressurized state and taken across section 2-2;

FIG. 5 is a schematic view of a system for adjusting a gap in a slot die for producing a polymeric web of the present invention including a hopper, an extruder, and a melt pump.

DETAILED DESCRIPTION

Figure 1A:
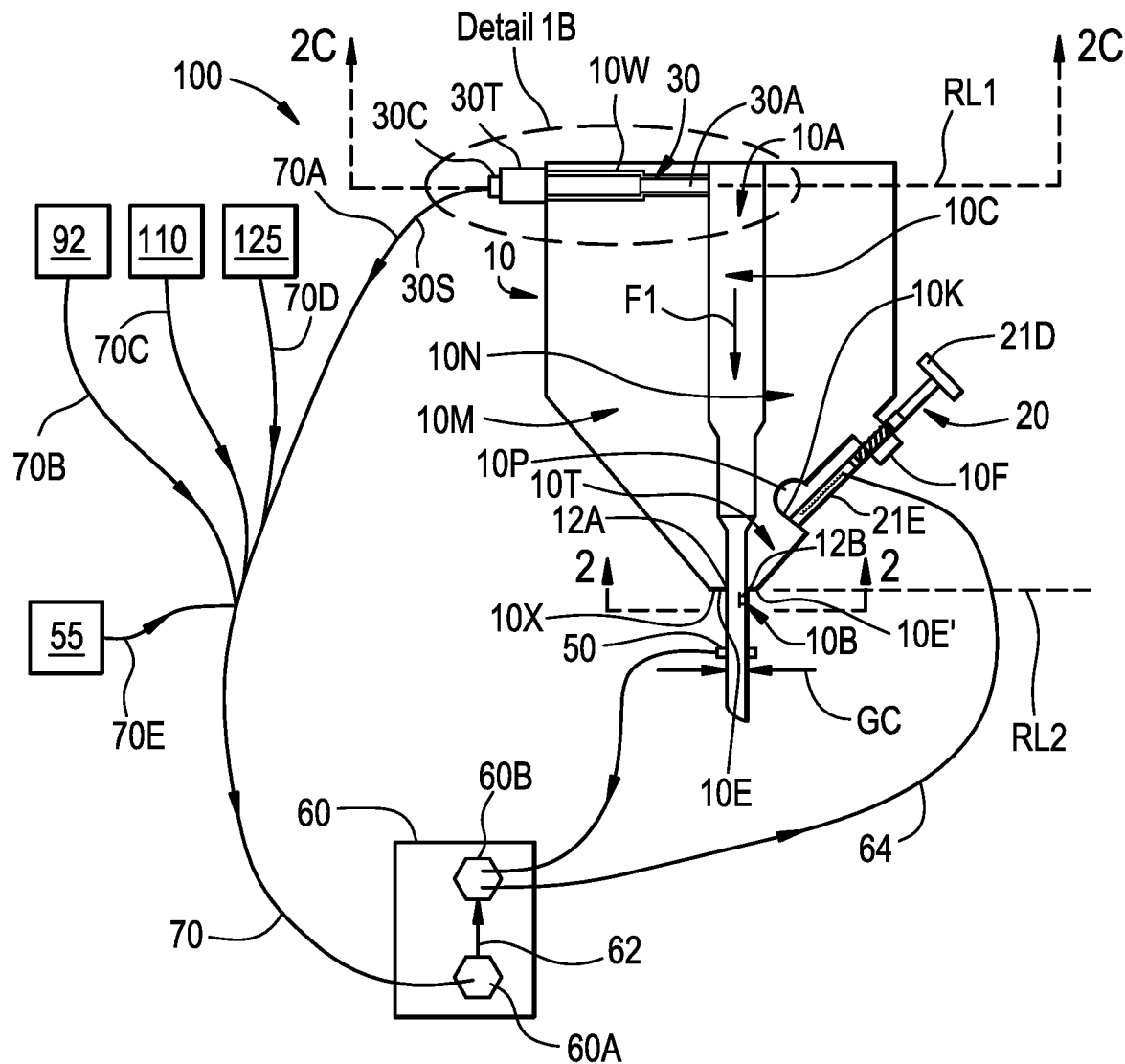
FIG. 1A is a schematic diagram of a system for adjusting a gap in a slot die for producing a polymeric web of the present invention.

As shown in FIG. 1A, a system for adjusting a gap GC in a slot die 10 for producing polymeric melt (e.g., a linear slot die) is generally designated by the numeral 100. The slot die 10 is a substantially metallic structure that includes an inlet referred to herein as a polymer inlet 10A and an outlet referred to herein as a melt outlet 10B. The slot die includes a reservoir referred to herein as a polymer reservoir 10C that extends between the polymer inlet 10A and the melt outlet 10B. The melt outlet 10B has a first edge 12A that extends longitudinally along the melt outlet 10B and a second edge 12B that extends longitudinally along the melt outlet 10B. The second edge 12B is opposite the first edge 12A. The second edge 12B is selectively moveable along a plurality of positions along a length of the second edge 12B, as described herein. The first edge 12A is spaced apart from the second edge 12B by a gap GC. As shown in FIGS. 2A and 2B, the gap GC is defined by a profile that extends between a first end 10X and a second end 10Y of the slot die 10.

Figure 3A:
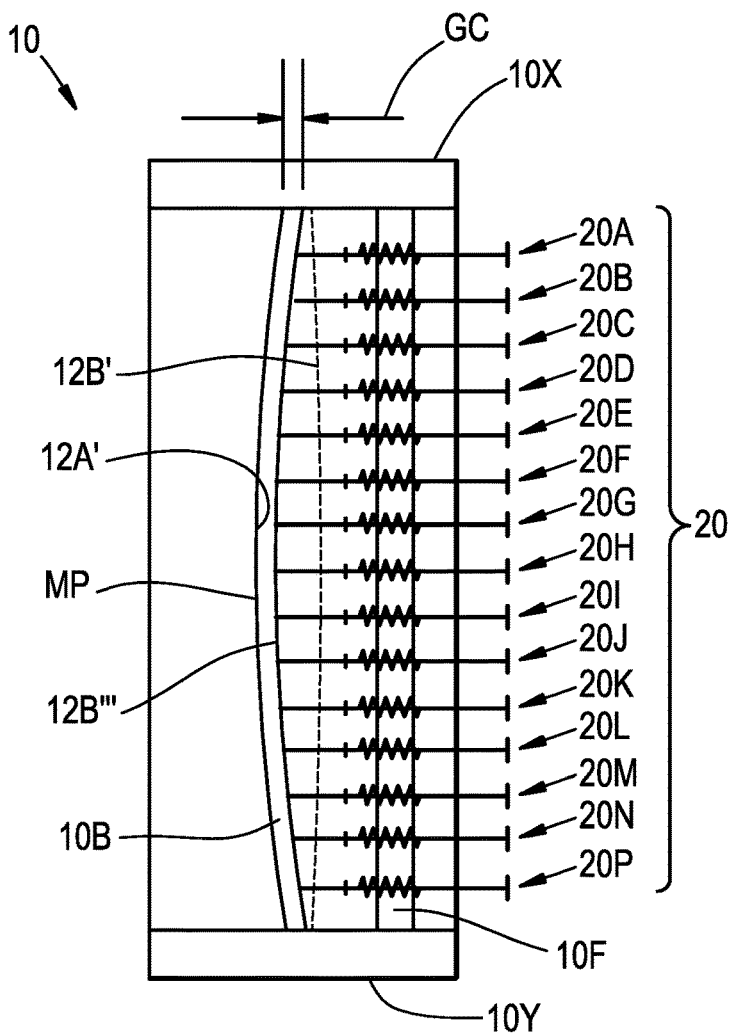
FIG. 3A is a schematic diagram of the slot die of FIG. 2B shown in a pressurized state and after adjustment of the variable die gap and showing the actuators.
Figure 3B:
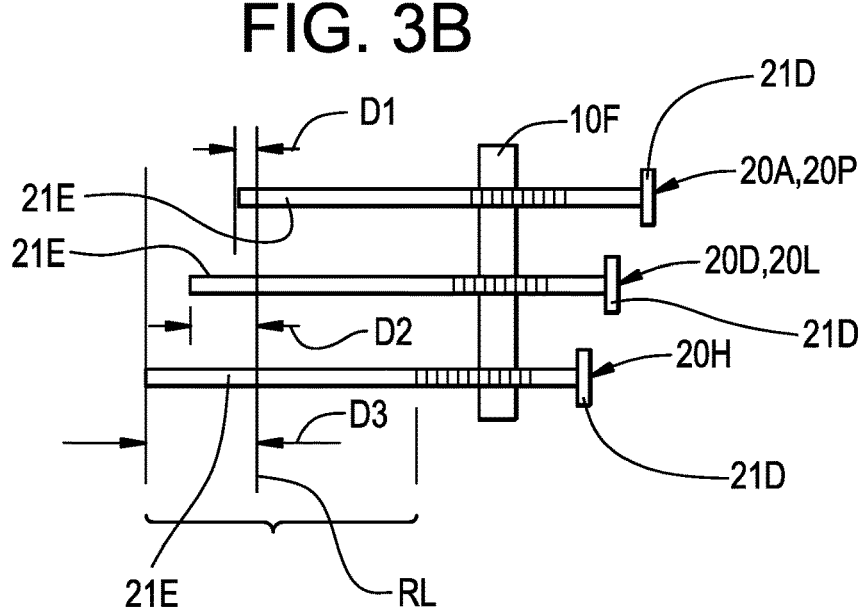
FIG. 3B is an enlarged view of several of the actuators of FIG. 3A, showing various gap adjustment magnitudes.
Figure 4:
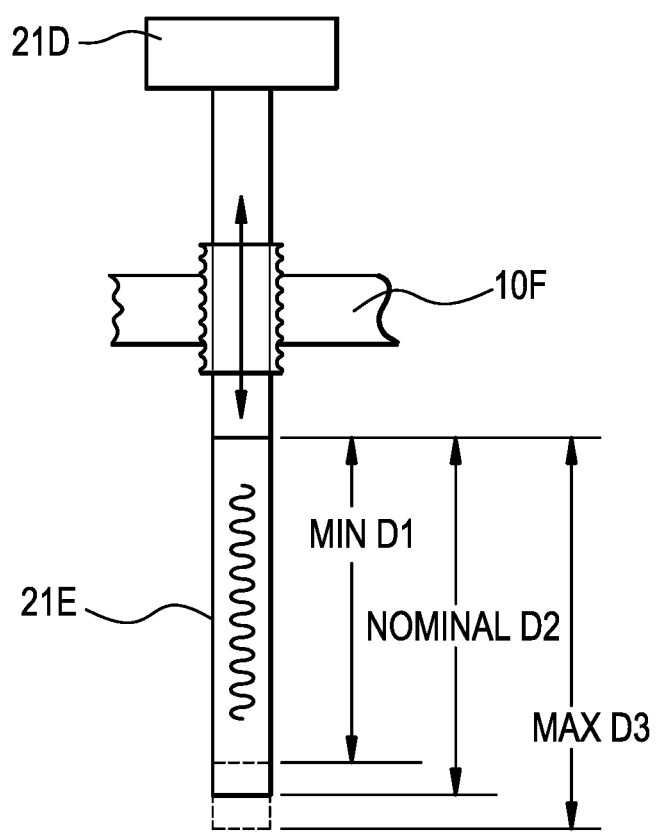
FIG. 4 is a front view of one of the actuators of FIG. 3B, showing a range of adjustment.

As best shown in FIG. 3A, a plurality of actuators 20 (e.g., fifteen actuators 20A, 20B, 20C, 20D, 20E, 20F, 20G, 20H, 20I, 20J, 20K, 20L, 20M, 20N, and 20P are shown) are secured to the slot die 10 at respective positions on an anchor frame 10F. Referring to FIGS. 3B and 4, each of the plurality of actuators 20 are die lip forming actuators that each include an extendable member 21E (e.g., a rod, a shaft, or the like) and a drive unit 21D (e.g., a servo motor) that is in communication with the extendable member 21E. The extendable member 21E is configured to move a portion of the second edge 12B relative to the first edge 12A in response to forces imparted by the drive unit 21D on the extendable member 21E.

As shown in FIG. 1A, in one embodiment, the slot die 10 is made from a first die section 10M and a second die section 10N. The first edge 12A extends along an outlet face 10E of the first die section 10M and the second edge 12B extends along an outlet face 10E' of the second die section 10N. The second die section 10N includes a depression 10P (e.g., a recess) formed therein between the second edge 12B and the anchor frame 10F. The depression 10P facilities flexibility of the second die section 10N that allows deflection of a tail end 10T of the second die section 10N upon application of a force to an abutment surface 10K extending from the depression 10P.

As shown in FIG. 1A, a pressure sensor 30 (e.g., a pressure transducer) is positioned to be in communication with the reservoir 10C via a pressure transmission line 30A (e.g., a tube, channel or conduit) that is integral with the pressure sensor 30. The pressure sensor 30 is configured to measure the pressure of the polymer in or near to the reservoir 10C. The pressure transmission line 30A is positioned in an opening 10W (e.g., a cylindrical bore) in the first die section 10M along a reference line RL1 that is parallel with a reference line RL2 that extends along the outlet faces 10E, 10E' of the slot die 10. The pressure transmission line 30A is positioned transverse to a direction (see arrow F1 in FIG. 1A) of flow of the polymeric melt from the polymer inlet 10A to the melt outlet 10B in the reservoir 10C. In one embodiment, the pressure transmission line 30A is positioned to prevent flow lines in the melt exiting the gap GC at the melt outlet 10B.

Figure 1B:
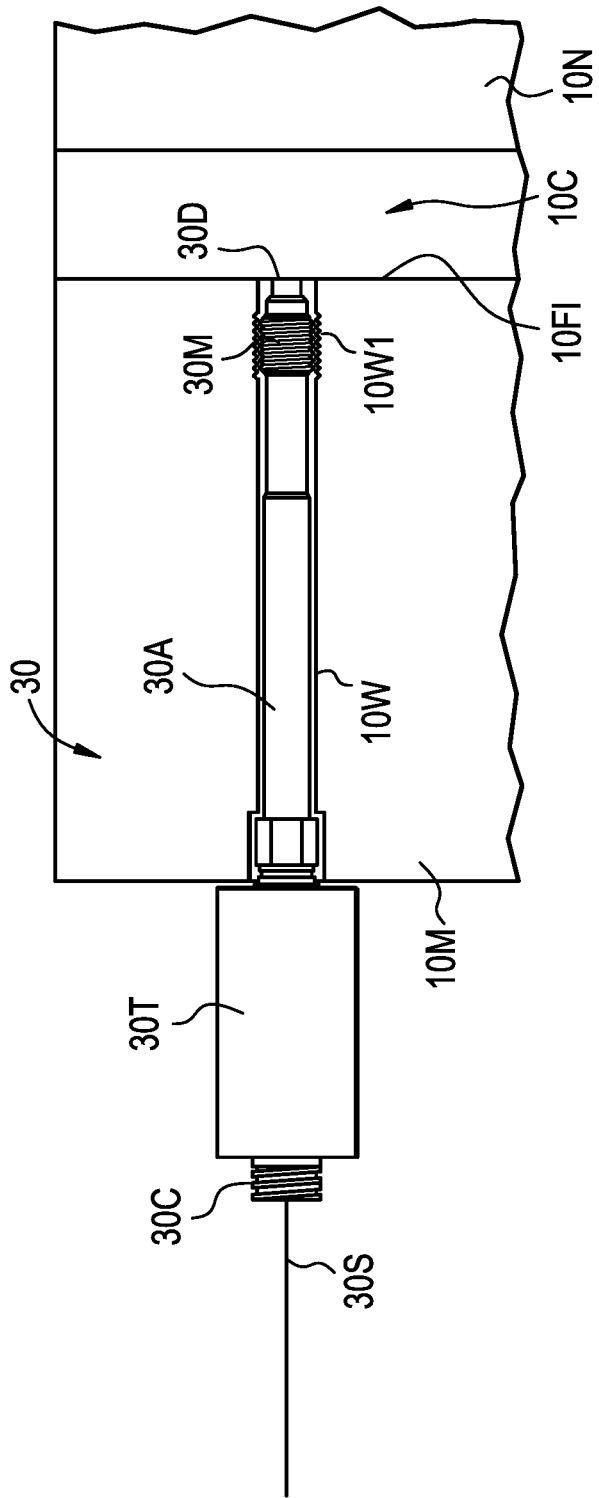
FIG. 1B is an enlarged view of Detail 1B of FIG. 1A, showing an exemplary pressure sensor used in the system.

As shown in FIG. 1B, the pressure sensor 30 is positioned such that the pressure transmission line 30A is located in the first die section 10M of the slot die 10. The pressure sensor 30 includes a pressure sensing diaphragm 30D that is connected to and in communication with the pressure transmission line 30A. The pressure sensing diaphragm 30D has a flat tip that is positioned flush against a flat interior surface 10F1 of the reservoir 10C of the slot die 10, to prevent flow lines in the melt exiting the gap GC at the melt outlet 10B. In some embodiments, the pressure transmission line 30A has a threaded portion 30M (e.g., male thread) at an end thereof adjacent the pressure sensing diaphragm 30D. The threaded portion 30M is threaded into a complementary threaded portion 10W1 (e.g., female thread) formed in the opening 10W in the first die section 10M. The pressure sensor 30 includes a pressure transducer 30T connected to and in communication with the pressure transmission line 30A. The pressure transducer 30T is located outside of the slot die 10. The pressure transducer 30T is connected to a signal line 30S via connector 30C.

Figure 2C:
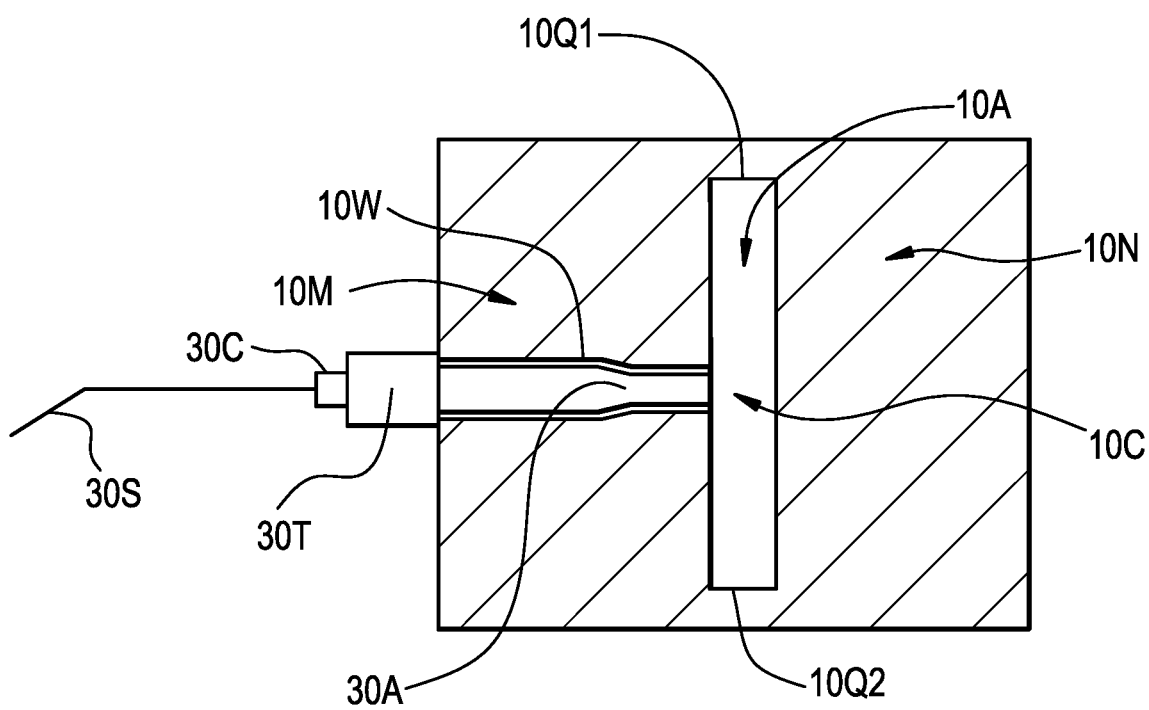
FIG. 2C is a cross sectional view of the slot die of FIG. 1A taken across section 2C-2C.

As shown in FIG. 2C, in one embodiment, the pressure transmission line 30A is positioned between a first side 10Q1 and a second side 10Q2 of the reservoir 10C of the slot die 10. In one embodiment, the pressure transmission line 30A is positioned halfway between the first side 10Q1 and the second side 10Q2 of the reservoir 10C of the slot die 10. In one embodiment, the pressure transmission line 30A is positioned transverse to the reservoir 10C of the slot die 10 as measured between the first side 10Q1 and the second side 10Q2 of the reservoir 10C.

As shown in FIG. 1A, the system 100 includes a control unit 60 that is in communication with the pressure sensor 30 via the signal line 30S. The control unit 60 includes a first algorithm 60A or a "Macro" control algorithm that has software configured with one or more sets of empirical data (i.e., information acquired by observation or experimentation and presented in the form of recorded data) that correlates the profile of the gap GC to the pressure in the reservoir 10C, as discussed in detail below. The first algorithm 60A is configured to generate control signals 62 which are sent to an automatic profile control algorithm 60B which is further configured to generate actuator control signals 64 which are sent to each of the plurality of actuators 20 to cause the drive unit 21D to move the extendable member 21E and to thereby cause the gap GC to be uniform (see FIG. 3A) between the first edge 12A and the second edge 12B of the slot die 10. In some embodiments, the first algorithm 60A is configured to generate control signals 62 which are sent directly to each of the plurality of actuators 20 to cause the drive unit 21D to move the extendable member 21E and to thereby cause the gap GC to be uniform (see FIG. 3A) between the first edge 12A and the second edge 12B of the slot die 10.

As shown in FIG. 2A, prior to pressurization of the reservoir 10C, the gap GC has a profile with a uniform magnitude G between the first edge 12A and the second edge 12B of the slot die 10. In one embodiment, prior to pressurization of the reservoir 10C, the gap GC has a profile with a uniform magnitude G of 0.025 inch to 0.030 inch (0.635 mm to 0.762 mm).

As shown in FIG. 2B, when the reservoir 10C is initially pressurized the gap GC has a parabolic profile G' with a maximum value at a point midway between the first end 10X and the second end 10Y of the slot die 10 and minimum values adjacent to the first end 10X and the second end 10Y of the slot die 10. In one embodiment, the gap GC has a maximum value of 0.045 inch to 0.050 inch (0.885 mm to 1.263 mm) at a midpoint MP of the slot die 10. In one embodiment, the gap GC has a parabolic profile G' with a minimum value of 0.035 inch to 0.040 inch (0.89 mm to 1.016 mm) at an endpoint EP of the slot die 10. In FIG. 2B, the first edge 12A' is shown bowed (e.g., elastically deformed) away from the static position of the first edge 12A shown in FIG. 2A, which is designated in FIG. 2B by the dashed line 12A". The second edge 12B' is shown bowed (e.g., elastically deformed) away from the static position of the second edge 12B shown in FIG. 2A, which is designated in FIG. 2B by the dashed line 12B".

Referring to FIG. 3A, the system 100 compensates for swelling or clam shelling of the gap GC of the slot die 10 that is caused by a polymeric melt flowing through the melt outlet 10B (e.g., in the form of a slot opening) by automatically adjusting the gap GC with the actuators 20 proportional to the throughput rate (i.e., flow rate) and/or the throughput pressure (i.e., pressure of the polymeric melt) of the polymeric material. Specifically, the system 100 controls the melt outlet 10B of the slot die 10 to achieve a flat polymeric melt profile while the process is at rest or while ramping up. The system 100 compensates for a dynamic input pressure (e.g., increasing pressure) at or near the melt outlet 10B of the slot die 10 while ramping up and/or until reaching steady state operation by automatically adjusting and controlling the gap GC. In some embodiments, once at steady state operation, the automatic profile control algorithm 60B takes over to control the gap GC. Referring to FIG. 1A, the control unit 60 includes an internal first algorithm 60A and an internal automatic profile control algorithm 60B. While an internal automatic profile algorithm 60B is shown and described, the present invention is not limited in this regard as other configurations are contemplated including but not limited to incorporating an external automatic profile control algorithm.

The system 100 is employed prior to activation of a measuring device 50 that traverses the solidified polymeric melt, as discussed in detail below. Thus, the system 100 controls the thickness of the formed polymeric melt on a "macro scale" (i.e., in advance of activation of the automatic profile control algorithm 60B that is faster in achieving the desired flat polymeric melt thickness and profile than if only the automatic profile control algorithm 60B was used in response to the measurement device 50. In one embodiment, the system 100 is linked to the automatic profile control algorithm 60B and control of the formed polymeric melt to a flat profile is accelerated because the actuators 20 are adjusted prior to steady state operation. As a result, the system 100 according to the present disclosure accelerates the control to a flatter profile of the polymeric melt in less time than using only the automatic profile control algorithm 60B because the system 100 accurately adjusts the gap GC prior to steady state operation. The faster control according to the present invention also reduces waste during production and enhances quality of the final product.

In operation, the automatic control position of each actuator 20 is linked to a set point rate in the first algorithm 60A driving the individual actuators (e.g., actuators 20A, 20B, 20C, 20D, 20E, 20F, 20G, 20H, 20I, 20J, 20K, 20L, 20M, 20N, and 20P, as depicted in FIG. 3A) into their macro positions (i.e., adjusting the profile of the gap GC before steady state operation) to accelerate the control response while the line is ramping up and before activating the measuring device 50 (e.g., specific web measurement systems that traverse the formed polymeric melt) with control via the automatic profile control algorithm 60B. In the embodiment depicted in FIG. 1A, when the system 100 is at rest and during startup, the first algorithm 60A adjusts the actuators 20 to adjust the profile of the gap GC based on the pressure of the polymeric melt within the reservoir 10C, as measured by the pressure sensor 30. After startup operation wherein the system is controlling the gap GC, once the slot die 10 reaches steady state operation, the measuring device 50 measures the formed polymeric melt exiting the slot die 10 (i.e., measures the thickness, mass, thickness and mass, or thickness and weight, etc.) and initiates control of the actuators 20. In one embodiment, the automatic profile control algorithm 60B is employed during steady state operation to provide broad adjustments to the profile of the formed polymeric melt. In one embodiment, the first algorithm 60A is employed during steady state operation to further fine tune the profile of the formed polymeric melt. The system 100 allows control of the slot die 10 by the automatic profile control algorithm 60B to take place sooner than in prior art methods, for example, the system 100 allows control of the slot die 10 in a ramp up state in advance of the steady state control (i.e., automatic profile control algorithm 60B) of the thickness of the formed polymeric melt. The system 100 is employed during startup and can be shut off during steady state operation or can be combined with the steady state control (i.e., automatic profile control algorithm 60B) during the steady state operation to reduce the time it takes to achieve a uniform web profile (i.e., consistent thickness of the formed polymeric melt) and to reduce the polymeric waste generated.

The polymeric material within the slot die 10 is under pressure as a result of its viscosity and based on its ability to flow through its cross-machine pressure compensating manifold, against its flow surfaces and melt outlet 10B. Pressure increases with increases in throughput rate and the resultant deflection of the gap GC. The pressure sensor 30 provides a real time running pressure value into the first algorithm 60A to also determine the amount of actuator 20 correction required to compensate for deflection of the gap GC at the melt outlet 10B of the slot die 10.

The pressure created by the polymeric melt and its restriction to flow through the slot die 10 as a result of melt viscosity causes swelling or clam shelling of the melt outlet 10B and the first and second edges 12A, 12B, respectively. A pressure measured within the slot die 10 or prior to the slot die 10 in the melt capillary delivery system (i.e., within the polymer reservoir 10C) is used in the first algorithm 60A to accelerate the control to a flat or even transverse melt, film, or coating profile. Examples of the clam shelling effect is depicted in FIG. 2B and the automatic compensating position is depicted in FIG. 2A.

The actuator 20 is illustrated in FIGS. 3A and 3B. Each individual actuator (e.g., actuators 20A, 20B, 20C, 20D, 20E, 20F, 20G, 20H, 20I, 20J, 20K, 20L, 20M, 20N, and 20P, as depicted in FIG. 3A) can be manually adjusted to adjust the profile of the gap GC as shown in FIGS. 3A and 3B. The adjustment is illustrated in detail in FIG. 4 as a screw type thread but other adjustment means do not depart from the invention disclosed herein.

The manual adjustment of the actuators shown in FIGS. 3A, 3B, and 4 includes an automatic adjusting device whereby, for the purpose of illustration, the actuators length or stroke is automatically altered within a set control stroke range to affect a change on the melt outlet 10B of the first and second edges 12A, 12B, respectively. Within the control stroke range, the stroke is infinitively adjustable.

Additionally the clam shelling of the melt outlet 10B is primarily affected by pressure as can be created by, but not limited to, the profile of the gap GC with a uniform profile G, lip gap final land length, metal temperatures of the die, polymeric temperature, skin layer materials of the polymeric structure flowing against the walls of the die, and viscosity of the polymeric materials. For this reason, the first algorithm 60A includes a trim or gain adjustment implemented as a tuning input, which in turn increases or decreases the shape of the parametric amount of die swell or clam shelling required to adjust the profile of the gap GC for any specific condition.

The use of the pressure sensor 30 in cooperation with the control unit 60 allows rapid adjustment of the size of the profile of the gap GC before the slot die 10 reaches steady state production of the melt and control of the melt thickness via thickness measurements of the melt. This reduces the amount of waste of the melt and shortens the time required to achieve consistent and constant thickness of the melt.

As shown in FIGS. 1A and 5, the system 100 includes a flow rate signal 70 that communicates flow rate information of the polymeric material to the control unit 60. The flow rate signal 70 includes a pressure signal 70A received from the pressure sensor 30. As discussed above, the pressure sensor 30 is configured to measure the pressure of the polymer in or near the reservoir 10C. The pressure sensor 30 generates the pressure signal 70A based on the measured pressure of the polymer and communicates the pressure signal 70A to the control unit 60.

In some embodiments, the flow rate signal 70 includes a hopper weight based flow rate signal 70B received from a system for measuring weight 92 (e.g., load cells or load sensors) of the polymeric material in a hopper 90, as shown in FIGS. 1A and 5. The load cells measure the weight of the polymeric material in the hopper 90 and communicate the hopper weight based flow rate signal 70B to the control unit 60. The loss in weight over time measured by the load cells 92 establishes the running rate. The loss in weight over time as measured by the load cells 92 does not establish the running rate when the hopper 90 is being filled (i.e., when the load cells 92 detect an increase in weight, the running rate calculation is paused until the load cells 92 detect a decrease in weight again).

In some embodiments, the flow rate signal 70 includes an extruder screw rotational speed based flow rate signal 70C received from a tachometer system. In some embodiments, the tachometer system includes a tachometer 110 that measures the rotational speed (e.g., rotations per minute) of a motor that rotates an extruder screw 105X and/or that measures rotational speed of the extruder screw 105X disposed for rotation in an extruder 105, as shown in FIGS. 1A and 5. The tachometer system generates the extruder screw rotational speed based flow rate signal 70C which is communicated to the control unit 60. In the embodiment depicted in FIG. 5, the tachometer 110 measures the rotations per minutes of a motor 112 that is driving the extruder screw 105X, but a tachometer 110 measuring the rotations per minute of the extruder screw 105X of the extruder 105 directly does not depart from the invention disclosed herein. The extruder screw rotational speed based flow rate signal 70C is determined based on knowing the weight of the material exiting the extruder 105 per rotation and the screw rate of the extruder 105.

In some embodiments, the flow rate signal 70 includes a gear set rotational speed based flow rate signal 70D received from the tachometer system. In some embodiments, the tachometer system includes a tachometer 125 that measures the rotational speed (e.g., rotations per minute) of one or more gears in a gear set 122 of a gear type melt pump 120, as shown in FIGS. 1A and 5. The tachometer system generates the gear set rotational speed based flow rate signal 70D which is communicated to the control unit 60. The rotations of the gear set 122 of the melt pump 120 are measured and the output rate of material per rotation is known to establish the output rate of the material from the melt pump 120 into the slot die 10.

In some embodiments, the flow rate signal 70 includes a desired profile flow rate signal 70E received from a set point rate 55, as shown in FIGS. 1A and 5. The set point rate 55 generates the desired profile flow rate signal 70E based on historical data of a tuned and/or calibrated melt forming process, and the set point rate 55 communicates the desired profile flow rate signal 70E to the control unit 60. The set point rate 55 allows shaping of the slot die 10 to take place prior to operation of the system 100 and allows a preshaping of the first and second edges 12A, 12B, respectively, prior to steady state operation.

In some embodiments, the flow rate signal 70 includes the pressure signal 70A, the hopper weight based flow rate signal 70B, the extruder screw rotational speed based flow rate signal 70C, the gear set rotational speed based flow rate signal 70D, and the desired profile flow rate signal 70E. The combined flow rate signal 70 is communicated to the control unit 60 to generate control signals 62, 64 to each of the plurality of actuators 20, as discussed in detail below.

In some embodiments, the first algorithm 60A includes software that is configured with a set of polymer pressure flow rate empirical data (i.e., information acquired by observation or experimentation related to how pressure affects the flow rate of the polymeric material and presented in the form of recorded data) to correlate the flow rate of the polymer with a future pressure (i.e., anticipated or calculated via empirical data) in the reservoir 10C. The first algorithm 60A is configured to generate a control signal 62 which is sent to the automatic profile control algorithm 60B, which in turn generates actuator control signals 64 which are sent to each of the plurality of actuators 20 to cause the drive unit 21D to move the extendable member 21E and to thereby cause the gap GC to be uniform (see FIG. 3A) between the first edge 12A and the second edge 12B of the slot die 10, prior to the future pressure being achieved in the reservoir 10C.

In some embodiments, the first algorithm 60A includes software that is configured with a set of polymer weight flow rate empirical data (i.e., information acquired by observation or experimentation related to how weight of the polymeric material affects the flow rate of the polymeric material and presented in the form of recorded data) to correlate the pressure signal 70A and the hopper weight based flow rate signal 70B to the profile of the gap GC. The first algorithm 60A is configured to generate a control signal 62 which is sent to the automatic profile control algorithm 60B which is further configured to generate actuator control signals 64 which are sent to each of the plurality of actuators 20 to cause the drive unit 21D to move the extendable member 21E and to thereby cause the profile of the gap GC to be uniform between the first edge 12A and second edge 12B of the slot die 10.

In some embodiments, the first algorithm 60A includes software that is configured with a set of polymer extrusion flow rate empirical data (i.e., information acquired by observation or experimentation related to how rotational speed of an extruder screw affects the flow rate of the polymeric material and presented in the form of recorded data) to correlate the pressure sensor signal 70A and the extruder screw rotational speed based flow rate signal 70C to the profile of the gap GC. The first algorithm 60A is configured to generate a control signal 62 which is sent to the automatic profile control algorithm 60B which is further configured to generate actuator control signals 64 which are sent to each of the plurality of actuators 20 to cause the drive unit 21D to move the extendable member 21E and to thereby cause the profile of the gap GC to be uniform between the first edge 12A and second edge 12B of the slot die 10.

In some embodiments, the first algorithm 60A includes software that is configured with a set of polymer pump flow rate empirical data (i.e., information acquired by observation or experimentation related to how rotational speed of one or more gears in a gear set of a gear type melt pump affects the flow rate of the polymeric material and presented in the form of recorded data) to correlate the pressure signal 70A and the gear set rotational speed based flow rate signal 70D to the profile of the gap GC. The first algorithm 60A is configured to generate a control signal 62 which is sent to the automatic profile control algorithm 60B which is further configured to generate actuator control signals 64 which are sent to each of the plurality of actuators 20 to cause the drive unit 21D to move the extendable member 21E and to thereby cause the profile of the gap GC to be uniform between the first edge 12A and second edge 12B of the slot die 10.

In some embodiments, the first algorithm 60A includes software that is configured with a set of polymer historical flow rate empirical data (i.e., information acquired by observation or experimentation related to historical flow rates that resulted in polymeric materials having a desired profile and presented in the form of recorded data) to correlate the pressure signal 70A and the desired profile flow rate signal 70E to the profile of the gap GC. The first algorithm 60A is configured to generate a control signal 62 which is sent to the automatic profile control algorithm 60B which is further configured to generate actuator control signals 64 which are sent to each of the plurality of actuators 20 to cause the drive unit 21D to move the extendable member 21E and to thereby cause the profile of the gap GC to be uniform between the first edge 12A and second edge 12B of the slot die 10.

As shown in FIG. 3A, the plurality of actuators 20 cause the second edge 12B''' to move towards the deformed state of the first edge 12A' so that the gap GC is uniform. Each of the plurality of actuators 20 moves the second edge 12B''' a different distance depending on the position relative to the midpoint MP and the first end 10X and the second end 10Y of the slot die 10. For example, in FIG. 3B, the drive units 21D of the actuators 20A and 20P adjacent to the first end 10X and the second end 10Y, respectively, are shown having moved the respective extendable member 21E a distance D1 from a reference line RL; the drive unit 21D of the actuator 20D (located between the first end 10X and the midpoint MP) and the drive unit 21D of the actuator 20L (located between the second end 10Y and the midpoint MP) are shown having moved the respective extendable member 21E a distance D2 from a reference line RL; and the drive unit 21D of the actuator 20H (located at the midpoint MP) is shown having moved the respective extendable member 21E a distance D3 from a reference line RL. The distance D3 is greater than the distance D2, which is greater than the distance D1. The other actuators 20B, 20C, 20E, 20F, 20G, 20I, 20J, 20K, 20M, and 20N move respective distances according to their location relative to the midpoint MP and the first end 10X and the second end 10Y of the slot die 10.

In the embodiment depicted in FIGS. 1A and 5, the pressure signal 70A based on the pressure measured by the pressure sensor 30 is the most accurate way to control the thickness of the formed polymeric melt, and using the hopper weight based flow rate signal 70B, the extruder screw rotational speed based flow rate signal 70C, the gear set rotational speed based flow rate signal 70D, and/or the desired profile flow rate signal 70E are less accurate for controlling the profile of the formed polymeric melt.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for adjusting a gap in a slot die for producing a polymeric web, the system comprising:
a slot die comprising a polymer inlet and a melt outlet, a polymer reservoir extending between the polymer inlet and the melt outlet, a polymer melt within the polymer reservoir begins to solidify into a partially formed polymeric melt as it exits the melt outlet, the melt outlet having a first edge extending longitudinally along the melt outlet and a second edge extending longitudinally along the melt outlet and being opposite the first edge, the second edge being selectively moveable along a plurality of positions along a length of the second edge, the first edge being spaced apart from the second edge by a gap having an adjustable profile extending between a first end and a second end of the slot die;
a plurality of actuators secured to the slot die at an anchor frame, each of the plurality of actuators comprising an extendable member and a drive unit in communication with the extendable member, the extendable member being configured to move a portion of the second edge relative to the first edge in response to forces generated by the drive unit to adjust the profile of the gap;
a pressure sensor in communication with the reservoir, the pressure sensor being configured to measure pressure of the polymer melt in the reservoir and generate a pressure signal; and
a control unit having a first algorithm and an automatic profile control algorithm, the control unit receives the pressure signal from the pressure sensor, the first algorithm comprising software configured with a set of polymer pressure flow rate empirical data correlating the profile of the gap to the pressure in the reservoir and the first algorithm being configured to generate a control signal to the automatic profile control algorithm, the automatic profile control algorithm being configured to generate actuator control signals to each of the plurality of actuators to cause the drive unit to move the extendable member to cause the profile of the gap to be uniform between the first end and the second end of the slot die.

2. The system of claim 1, wherein prior to pressurization of the reservoir the profile of the gap is of a uniform magnitude between the first end and the second end of the slot die and when the reservoir is initially pressurized the profile of gap has a parabolic profile with a maximum value at a point midway between the first end and the second end of the slot die and minimum values adjacent to the first end and the second end of the slot die.

3. The system of claim 1, further comprising a hopper having at least one load sensor configured to measure a loss in weight over time of a material contained in the hopper, the control unit being in communication with the at least one load sensor, the at least one load sensor generating a hopper weight based flow rate signal based on the loss in weight over time of the material contained in the hopper, the first algorithm comprising software configured with a set of polymer weight flow rate empirical data correlating the pressure signal and the hopper weight based flow rate signal to the profile of the gap and the first algorithm being configured to generate a control signal to the automatic profile control algorithm configured to generate actuator control signals to each of the plurality of actuators to cause the drive unit to move the extendable member to cause the profile of the gap to be uniform between the first end and the second end of the slot die.

4. The system of claim 1, further comprising a tachometer system comprising a tachometer measuring rotations per minute of at least one of a motor and an extruder screw of an extruder, the tachometer generating an extruder screw rotational speed based flow rate signal based on a correlation between the rotations of the extruder screw and an amount of polymeric material exiting the extruder, the first algorithm comprising software configured with a set of polymer extrusion flow rate empirical data correlating the pressure signal and the extruder screw rotational speed based flow rate signal to the profile of the gap and the first algorithm being configured to generate a control signal to the automatic profile control algorithm configured to generate actuator control signals to each of the plurality of actuators to cause the drive unit to move the extendable member to cause the profile of the gap to be uniform between the first end and the second end of the slot die.

5. The system of claim 1, further comprising a tachometer system comprising a tachometer measuring rotations per minute of a gear set of a melt pump, the tachometer generating a gear set rotational speed based flow rate signal based on a correlation between the rotations of the gear set of the melt pump and an amount of polymeric material exiting the melt pump, the first algorithm comprising software configured with a set of polymer pump flow rate empirical data correlating the pressure signal and the gear set rotational speed based flow rate signal to the profile of the gap and the first algorithm being configured to generate a control signal to the automatic profile control algorithm configured to generate actuator control signals to each of the plurality of actuators to cause the drive unit to move the extendable member to cause the profile of the gap to be uniform between the first end and the second end of the slot die.

6. The system of claim 1, further comprising a set point rate determining a necessary change in control of the control unit based on historical data to reach a desired profile of the gap, the set point rate generating a desired profile flow rate signal based on the desired profile of the gap, the first algorithm comprising software configured with a set of polymer historical flow rate empirical data correlating the pressure signal and the desired profile flow rate signal to the profile of the gap and the first algorithm being configured to generate a control signal to the automatic profile control algorithm configured to generate actuator control signals to each of the plurality of actuators to cause the drive unit to move the extendable member to cause the profile of the gap to be uniform between the first end and the second end of the slot die.

7. The system of claim 1, further comprising a measuring device that measures at least one of a thickness and mass of the partially formed polymeric melt exiting the slot die proximate to the melt outlet,
wherein the automatic profile control algorithm adjusts the profile of the gap in response to at least one of the thickness and mass of the formed polymeric melt measured by the measuring device.

8. The system of claim 7, wherein the control unit utilizes the first algorithm prior to and during a startup period of the system and the control unit utilizes at least one of the first algorithm and the automatic profile control algorithm during a steady state operation period.

9. A system for adjusting a gap in a slot die for producing a polymeric web, the system comprising:
a slot die comprising a polymer inlet and a melt outlet, a polymer reservoir extending between the polymer inlet and the melt outlet, a polymer melt within the polymer reservoir begins to solidify into a partially formed polymeric melt as it exits the melt outlet, the melt outlet having a first edge extending longitudinally along the melt outlet and a second edge extending longitudinally along the melt outlet and being opposite the first edge, the second edge being selectively moveable along a plurality of positions along a length of the second edge, the first edge being spaced apart from the second edge by a gap having an adjustable profile extending between a first end and a second end of the slot die;
a plurality of actuators secured to the slot die at an anchor frame, the plurality of actuators being configured to move a portion of the second edge relative to the first edge to adjust the profile of the gap;
a pressure sensor in communication with the reservoir, the pressure sensor being configured to measure pressure of the polymer melt in the reservoir;
a measuring device that measures at least one of a thickness and a mass of the partially formed polymeric melt exiting the slot die proximate to the melt outlet; and
a control unit in communication with the pressure sensor and the measuring device, the control unit having a first algorithm and an automatic profile control algorithm, the first algorithm comprising software configured with a set of polymer pressure flow rate empirical data correlating the profile of the gap to the pressure in the reservoir, the first algorithm being configured to generate a control signal to the automatic profile control algorithm in response to the pressure measured by the pressure sensor and the automatic profile control algorithm comprising software configured to generate actuator control signals to each of the plurality of actuators to adjust the profile of the gap in response to at least one of the thickness and mass of the formed polymeric melt measured by the measuring device,
wherein the control unit utilizes the first algorithm prior to operation of the system and during a startup period of the system and the control unit utilizes at least one of the first algorithm and the automatic profile control algorithm during a steady state operation period of the system.

10. The system of claim 9, wherein during the steady state operation period of the system the control unit utilizes the automatic profile control algorithm to generate broad adjustment actuator control signals that provide broad adjustments to the profile of the gap and the control unit utilizes the first algorithm to generate fine tuning adjustment actuator control signals that provide fine tuning adjustments to the profile of the gap.

* * * * *